May 4, 1926.

M. G. BENJAMIN

FURNACE CONTROL

Filed March 31, 1924

M. G. BENJAMIN

FURNACE CONTROL

Filed March 31, 1924

INVENTOR

May 4, 1926.
M. G. BENJAMIN
FURNACE CONTROL
Filed March 31, 1924   4 Sheets-Sheet 3
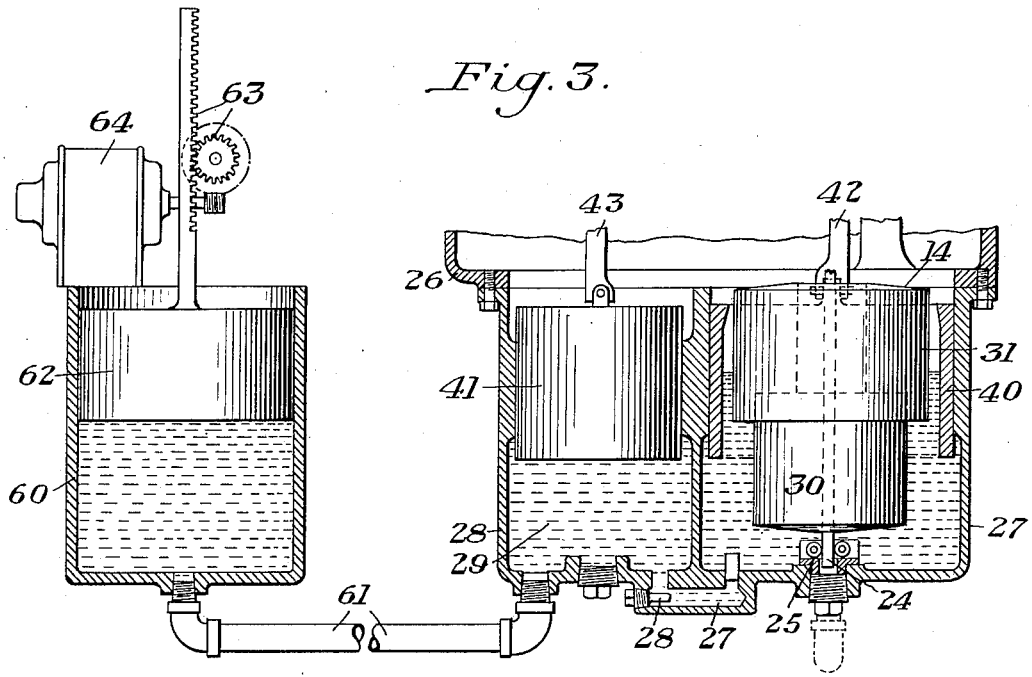
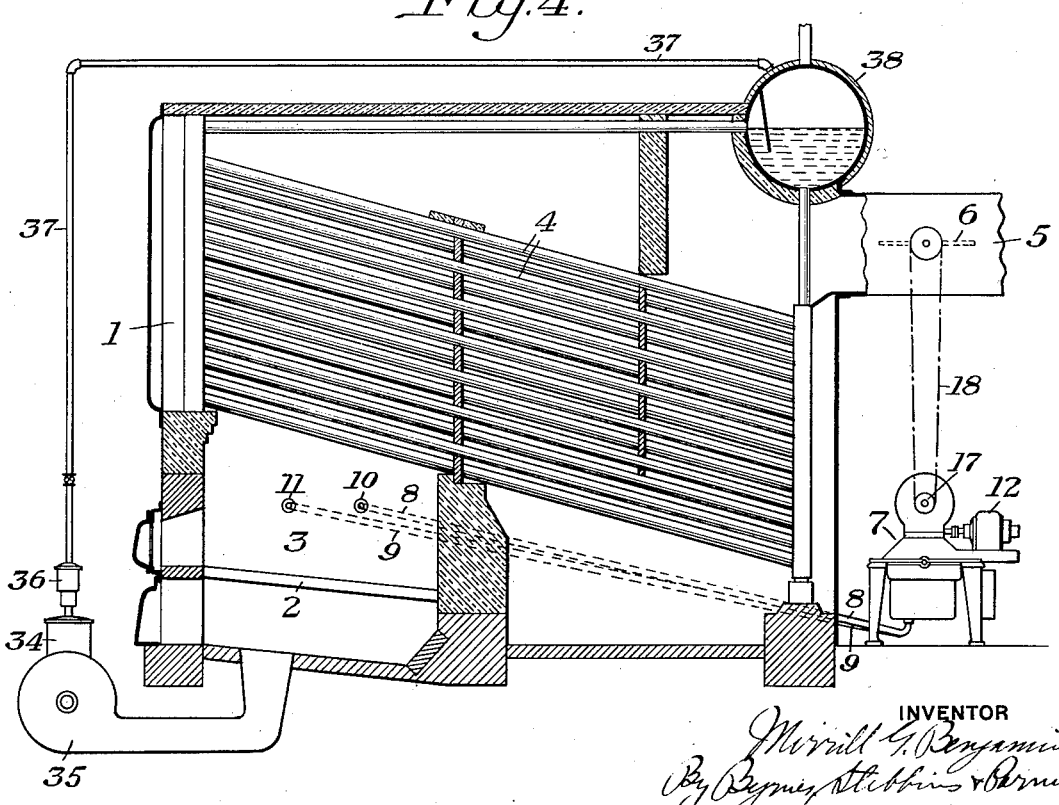
INVENTOR

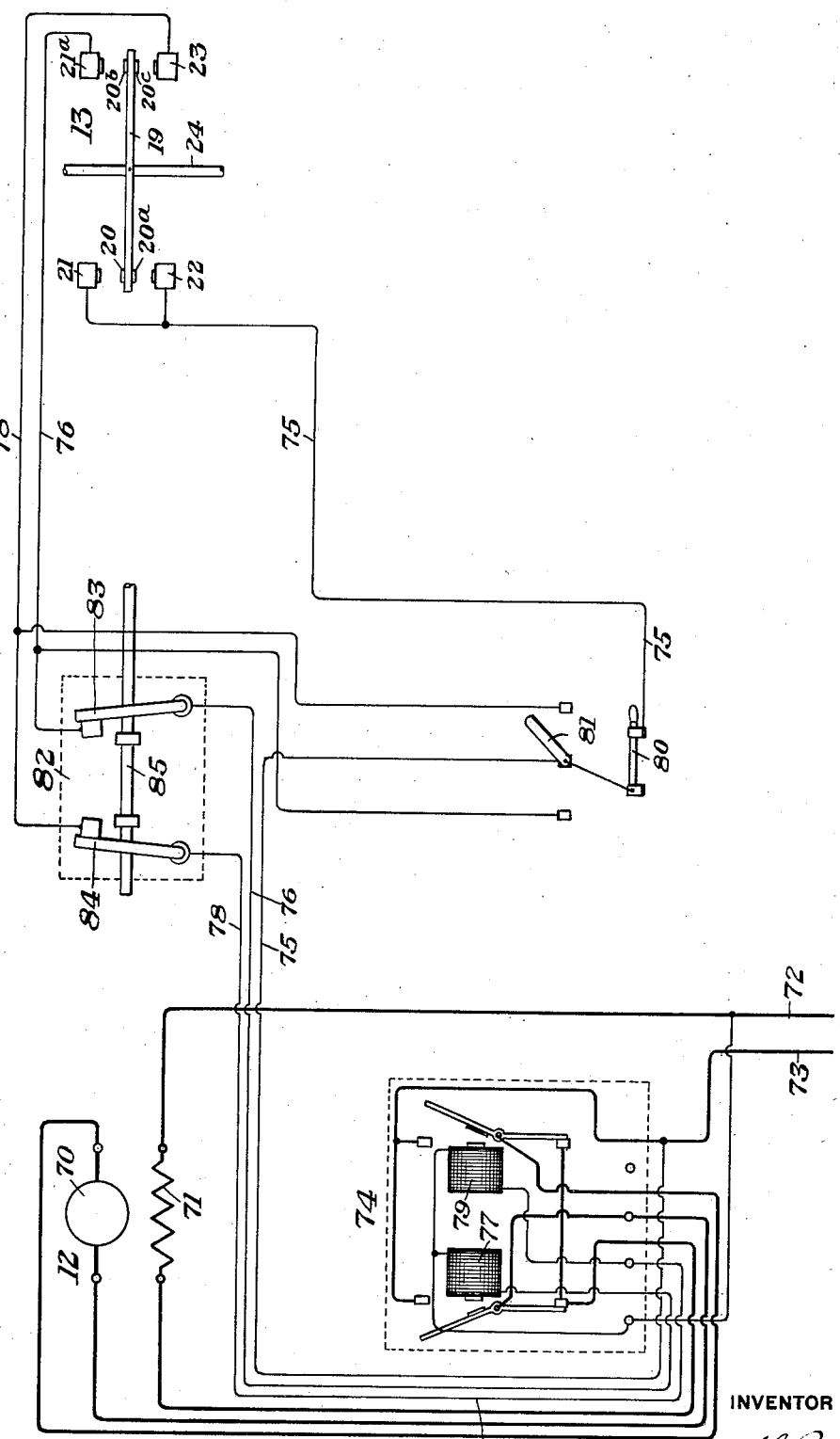

Patented May 4, 1926.

1,583,440

UNITED STATES PATENT OFFICE.

MERRILL G. BENJAMIN, OF LAKEWOOD, OHIO.

FURNACE CONTROL.

Application filed March 31, 1924. Serial No. 703,325.

*To all whom it may concern:*

Be it known that I, MERRILL G. BENJAMIN, a citizen of the United States, residing at Lakewood, county of Cuyahoga, State of Ohio, have invented a new and useful Improvement in Furnace Controls, of which the following is a full, clear, and exact description.

The present invention relates to furnace control and more especially to means for controlling the furnace draft in accordance with some function of the furnace, such for example as the pressure of the gases in the combustion chamber whereby such pressure may be maintained constant or progressively varied in accordance with the draft. The invention is illustrated as embodied in the control of a steam boiler furnace, the function of the furnace which operates the controlling device being in the illustrated case the pressure of the gases over the fire in the combustion chamber. The controlling means regulates the draft, in the illustrated embodiment by means of a damper, so as to maintain a substantially constant pressure of the gases in the combustion chamber or so as to increase the draft somewhat at higher boiler ratings. The draft regulating means is provided with mechanism for preventing the overtravel of the regulating means.

In the drawings which illustrate the preferred embodiment of the invention,

Figure 3 is a sectional view showing a modification;

Figure 4 is a view, largely diagrammatic, showing the application of the regulator to the boiler furnace; and Figure 5 is a wiring diagram of the electrical connections.

Figure 1:
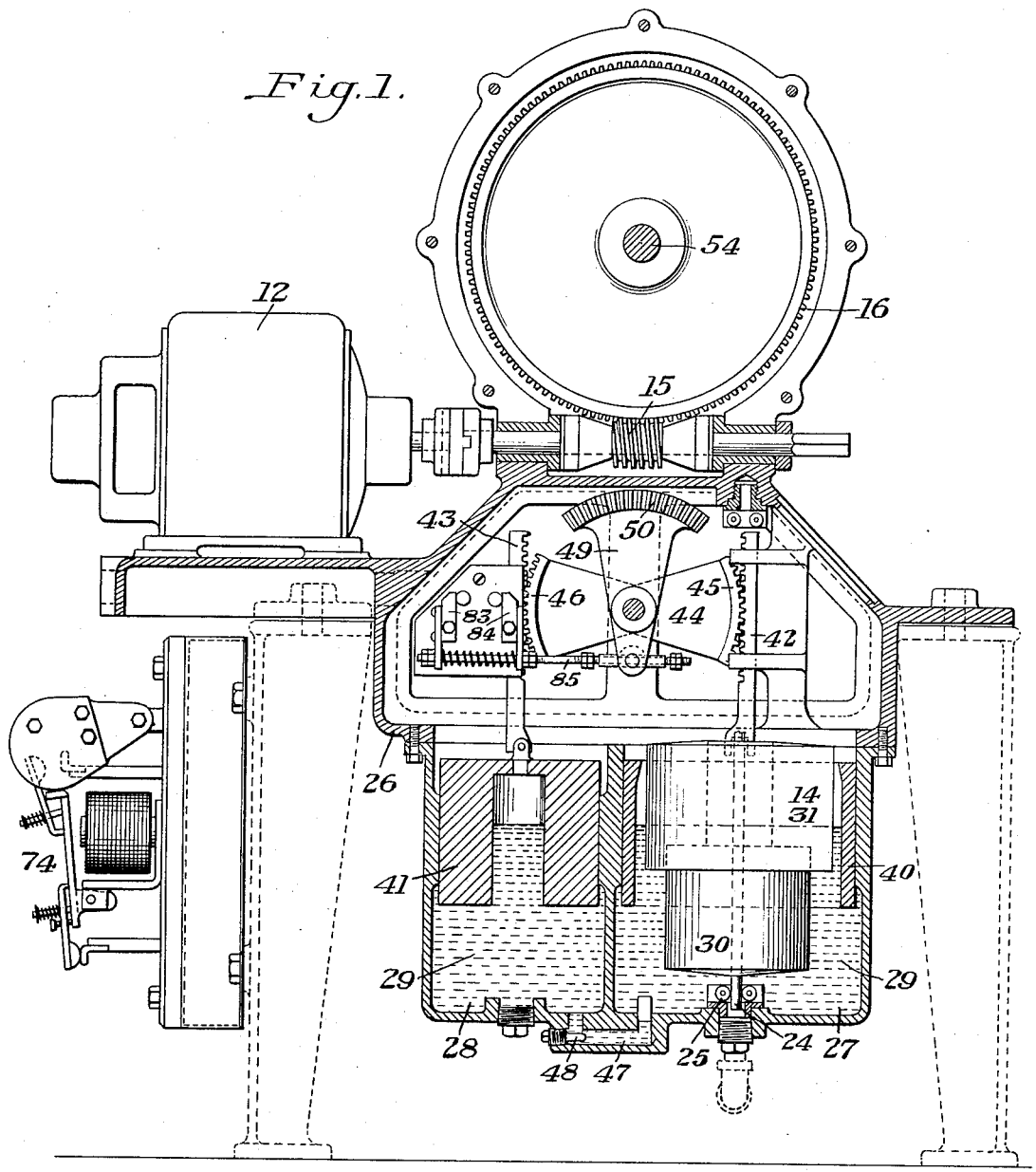
Figure 1 is a vertical section, taken partly in elevation, of the regulator.

Referring to the illustrated embodiment of the invention, reference numeral 1 indicates generally a steam boiler furnace to which the furnace control of the present invention is applied. The furnace has the usual grate 2 and combustion chamber 3 above the grate and the fuel bed. The gases of combustion pass through the passes of the boiler tubes 4 and out through the stack pipe 5 which is provided with a damper 6. The position of the damper 6 is controlled in accordance with the pressure of the gases in the combustion chamber 3. The regulator indicated generally by reference numeral 7 has a connection, in the illustrated embodiment such connection being two pipes 8 and 9 opening at 10 and 11 into the combustion chamber 3, whereby the variations in the pressure of the gases in the combustion chamber are transmitted to the regulating means. The regulator 7 shown in detail in Figures 1 and 2 comprises an electric motor 12 for operating the damper 6, a contact device indicated generally by reference numeral 13 for controlling the motor, and a gasometer float 14 actuated by the gas pressure in the combustion chamber for operating the contact device 13.

The motor 12 is connected through the worm 15 and gear 16 connection to a sheave 17 connected by a belt 18 or chain to the damper, so that the damper is opened or closed by the motor.

The motor is a reversing motor and is controlled through suitable relay connections, hereinafter described, by the gasometer controlled contact device 13. The contact device consists of a cross-bar 19 having four connected contacts 20, 20ª, 20ᵇ and 20ᶜ. When the cross-bar 19 is in its upper position the connection is made through it between the stationary contacts 21 and 21ª, and when in its lower position contact is made through it between the stationary contacts 22 and 23.

The arm 19 is carried on a vertically movable rod 24 connected with the gasometer float 14. Anti-friction bearings 25 guide the upper and lower ends of the rod 24.

The lower part of the machine casing, indicated generally by reference numeral 26, has two liquid containing chambers 27 and 28. These chambers contain suitable liquid 29 such as oil, upon which the gasometer float 14 rides. The gasometer float 14 comprises a closed float 30 and a bell 31 open at its bottom. The pipes 32 and 33 extend up into the bell 31. The pipes 32 and 33 are connected with the pipes 8 and 9 which lead to the combustion chamber of the furnace so that the pressure of the gases in the combustion chamber is transmitted to the space within the gasometer bell 31 above the liquid level. Two pipe connections are shown between the gasometer and the combustion chamber of the furnace, it being preferable to employ two in order to equalize the pressure in both sides of the furnace and as a precaution in case one should become stopped up.

The gasometer float 14 is so proportioned that it acts as an amplifying float and has a relatively large movement for any pressure variation communicated to it by the pipes 32 and 33. For example, it may be designed to give a movement of four inches for a pressure change of one inch of water. This amplified movement is highly advantageous in securing close regulation.

When the pressure of the gases in the combustion chamber increases the gasometer float 14 rises making contact between the upper set of contacts 21 and 21$^a$. This, through the relay connections, operates the motor in the direction to open the damper 6 and relieve the increased pressure in the combustion chamber. Similarly, if the pressure of the gases in the combustion chamber 3 falls below normal the gasometer float 14 falls, makes contact across the lower set of contacts 22 and 23 and operates the motor to close the damper 6, restricting the draft and thereby raising the pressure in the combustion chamber.

In the illustrated embodiment of the invention the furnace draft is illustrated as controlled by the steam pressure in the boiler, the engine 34 which drives the forced draft fan 35 being provided with the pressure regulator 36 connected through the pipe 37 with the header drum 38. As will be readily understood by any one skilled in this art, when the demand for steam increases, the boiler pressure falls and the forced draft fan 35 speeds up to increase the draft to carry the higher boiler rating. The variations in the speed of the draft fan will cause variations in the pressure of gases in the combustion chamber which will be corrected by the regulator 7. The regulator 7 will also correct any variations in the pressure of the gases in the combustion chamber, such as those occurring, for example, because of variations in the fuel bed or variations in the draft of the stack.

While in the illustrated embodiment of the invention the primary regulation of the draft is accomplished in accordance with a function of the furnace, in this case the boiler pressure, by means of the induced draft fan 35, and the variations in the pressure of the gases in the combustion chamber are corrected by the regulator 7, it will be obvious that these regulations might be interchanged or varied, as, for example, the boiler pressure might control the induced draft, and the regulator responsive to the variations of the pressure of the gases in the combustion chamber might control the forced draft. Moreover, the regulation here described may be used to maintain the pressure of the gases constant in portions of the furnace other than the combustion chamber immediately above the grate. For example, the pipes 9 and 10 might open into one of the passes of the boiler.

The action of the regulator 7 so far described would, unless compensated, have a tendency to make the damper 6 over-travel and have a tendency to hunt. For example, if the pressure of the gases in the combustion chamber increases, the pressure traveling along the pipes 9 and 10 is communicated to the gasometer bell which in turn rises and operates the electrical connections to start the motor to open the damper. The release in pressure due to opening the damper will not be felt immediately in the combustion chamber so that the tendency would be to open the damper more than necessary to compensate for the increased pressure in the combustion chamber.

In order to prevent overtravel of the motor and damper and consequent tendency to hunt, the regulator is provided with compensating mechanism. The liquid chambers 27 and 28 are provided with liquid displacing plungers 40 and 41, respectively. These plungers are hung on rack bars 42 and 43 respectively which engage a walking beam or lever 44 having the rack segments 45 and 46. Movement of the lever 44 raises one plunger and depresses the other plunger, thereby changing the oil level upon which the gasometer float 14 rides. A restricted pass 47 is provided between the bottoms of the liquid chambers 27 and 28 to allow the liquid to become equalized slowly after movement of the plungers. The pass 47 may be adjusted by the restricting plug 48 to adjust the time for equalizing the level of the oil in the chambers.

The lever 44 has an upright arm 49 provided with the gear segment 50 which meshes with bevel gear 51 driven through the shaft 52 and bevel gearing 53 from the shaft 54 which carries the damper operating sheave 17.

The operation of this compensating device is as follows: If the gas pressure in the combustion chamber rises the gasometer float 14 is raised and the motor operated to open the damper 6. This movement of the motor operates through the gearing connections 51 and 53 to turn the lever 44 so as to raise the plunger 40 and depress the plunger 41. This causes a momentary fall in the level of the oil 29 in the liquid chamber 27 and arrests the upward movement of the gasometer bell 14. This will cause the opening of the contact device 13 and the stoppage of the motor before it overtravels. The excess oil in the chamber 28 will thereupon run through the pass 47 and in a short time restore the oil level in the chamber 27 to normal. By the time the oil has resumed its position of normal equilibrium in the chambers 27 and 28, the effect of the damper opening will have had time to communicate itself to the combustion chamber 3, and if the damper has been opened the proper amount, no further movement of the regulator will take place until the next variation of the pressure in the gases in the combustion chamber. On the other hand if the increase in pressure in the combustion chamber has not been quite compensated for, the device will again operate to open the damper another step. If the pressure of the gases in the combustion chamber falls, the reverse operation will take place, the motor running in the direction to lower the plunger 40 and raise the plunger 41 to raise the oil level in the chamber 27.

By means of the adjusting plug 48, the time required for the oil in the two chambers to become restored to normal level may be adjusted to about equal the time required for the movement of the damper to communicate its effect to the gases in the combustion chamber.

In case it is desired to maintain a substantially constant pressure of the gases in the combustion chamber for different boiler ratings or drafts, the plungers 40 and 41 are made with the same cross-sectional area so that no matter where their position is, the oil level in the chamber 27 will always be restored to the same point by the flow through the pass 47. It is, however, sometimes desirable to vary the pressure of the gases in the combustion chamber in accordance with the boiler rating. For example, it may be desired to increase the draft with consequent lowering of the pressure of the gases in the combustion chamber at overload ratings of the boiler. In such case the plunger 41 is made larger than the plunger 40 so that as the motor turns in opening the damper 6 for higher boiler ratings, the plunger 41 descends and the plunger 40 is raised, thereby raising the normal liquid level in the chamber 27. This increased liquid level necessitates a lower gas pressure in the bell of the gasometer float 14 in order to hold the contact device 13 in its neutral position. The effect of such inequality of the plungers 40 and 41 is to make the regulator increase the stack draft, as the overload and rate of combustion increases.

The action of the compensating mechanism is proportional to the movement of the regulator initiated by the displacement of the gasometer bell 14. In case there is a considerable variation in the pressure of the gases to be corrected the plungers will have a relatively large movement before the oil level is changed to bring the contact device 13 to its neutral position, whereas if there is but a slight change in the gas pressure but a slight movement of the compensating device is necessary to prevent the overtravel of the motor. However, the compensating device in case of large variations will not operate to stop the motor as quickly as in case of small variations. For example, if the pressure change to be corrected is only slight the motor will merely start and then be stopped again, whereas if there is a large pressure change to be corrected, the compensating device will allow the motor to run and turn the damper for some distance before the change in oil level will overcome the comparatively large pressure variation to which the gasometer is subjected.

In Figure 3 is illustrated a modification which permits the pressure at which the gases in the combustion chamber are maintained to be adjusted by the operator. This modification consists in a supplemental cylinder 60 connected through pipe 61 to the oil chambers 27 and 28. The cylinder 60 has a piston 62 which is raised and lowered through a rack and gearing 63 by means of electric motor 64 so as to raise or lower the oil level as a whole in the oil chambers 27 and 28. By raising the oil level in the chambers 27 and 28 the pressure at which the regulator maintains the gases in the combustion chamber may be decreased; or it may be increased, vice versa. When this modification is employed the motor 64 will be controlled by suitable starting and reversing switch on the control panel.

The electrical connections shown in Figure 5 hereinbefore generally referred to are described in detail as follows:

The motor 12 is a reversing motor having the armature 70 and the series field 71. The electrical current is supplied from feeder mains 72 and 73. The motor is controlled by the relay operated reversing motor starter indicated generally by reference numeral 74 and controlled by the contact device 13. When the contact arm 19 closes contact between the stationary contacts 21 and 21$^a$ connection is made through the leads 75 and 76 to the relay 77 to drive the motor in one direction. When the contact arm 19 bridges the stationary contacts 22 and 23 the connection is made through the leads 75 and 78 to energize the relay 79 and drive the motor in the reverse direction. The reversing starter 74 is of standard construction and need not be described in structural detail.

Two switches are mounted on the control board to permit the operator to have the control operate automatically or manually. The switch 80 when closed connects the regulator for automatic operation. In the case the hand operation is desired the switch 80 is opened and the switch 81 is operated. The switch 81 has its middle contact connected with the lead wire 75 and its outer contacts connected with the lead wires 76 and 78 respectively, so that it can replace by normal operation, the automatic operation of the contact device 13.

Figure 2:
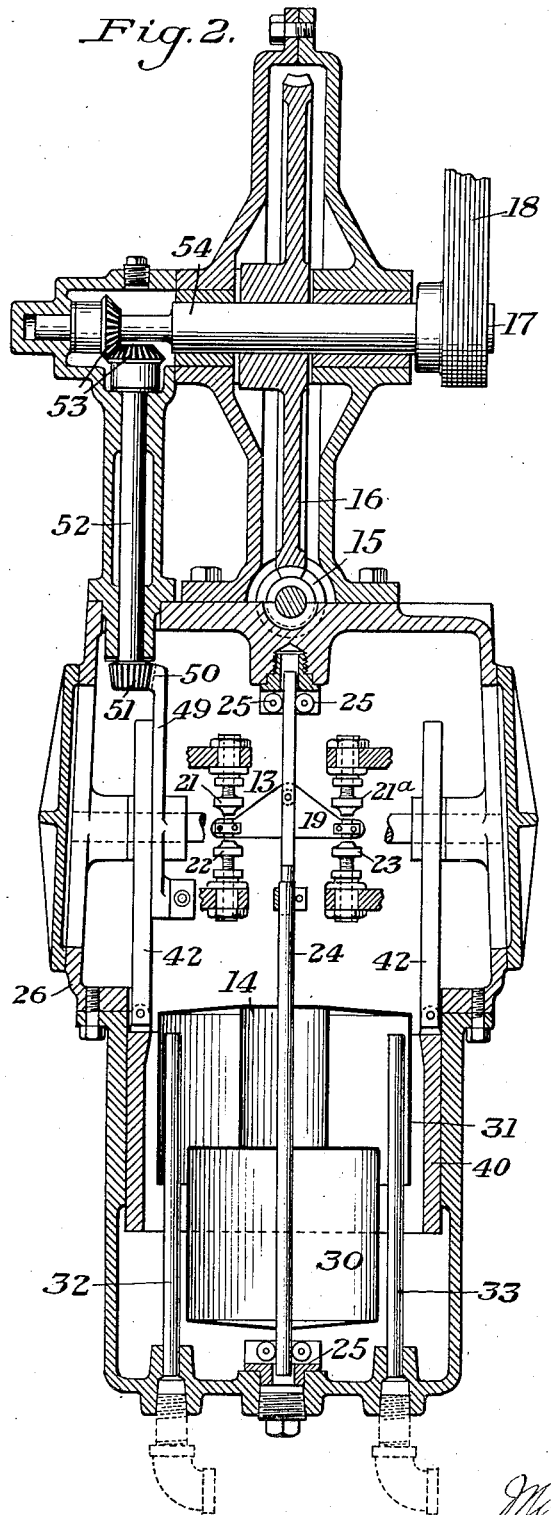
Figure 2 is a vertical section taken at right angles to Figure 1.

The regulator is provided with a limit switch indicated generally by reference numeral 82 from preventing the damper from traveling beyond its closed and open positions. The limit switch comprises two switches 83 and 84 interposed in the leads 76 and 78 respectively. These switches which are also shown in Figure 1 have their movable contacts carried on a rod 85 actuated by the lower end of the upright lever 50. After the regulator has operated to open the damper to its wide-open position, the limit switch opens so as to prevent further damper operation. Conversely, when the damper has closed to the position which is taken as its position of maximum closure, the limit switch will break the connections to prevent further operation of the motor by the regulator.

While I have specifically illustrated and described the preferred embodiment of my invention, it is to be understood that the invention is not limited to its illustrated embodiment but may be embodied in other structures within the scope of the following claims.

I claim:

1. The combination with a furnace, of means for regulating the furnace draft comprising an electric motor, a controlling switch therefor, a liquid chamber, a gasometer float in the chamber for operating the switch and having a connection with the furnace, and means operated by the motor for temporarily changing the liquid level to prevent overtravel of the motor, substantially as described.

2. The combination with a furnace, of damper regulating means comprising an electric motor for operating the damper, a controlling switch for the motor, a liquid chamber, and a gasometer float in the chamber having connection with the furnace whereby the pressure of the gases in the furnace is communicated to the gasometer float, and means operated by the motor for progressively varying the normal liquid level in accordance with variations in the rate of combustion, substantially as described.

3. The combination with a furnace, of means for regulating the furnace draft comprising an electric motor, a controlling switch for the motor, two liquid chambers, a gasometer float in one chamber for operating the controlling switch and having a connection with the furnace, liquid displacers in the chambers and connections between such displacers and the motor whereby the movement of the motor causes the liquid level to rise in one chamber and fall in the other chamber, and a pass for permitting liquid to flow from one chamber to the other to equalize its level, substantially as described.

4. The combination with a furnace, of means for regulating the furnace draft comprising a motor and means for controlling the motor including two liquid chambers, a float in one chamber having a connection with the furnace, said float being adapted to rise and fall in the liquid in accordance with the variations in the pressure of the gases in the furnace, liquid displacers in the chambers and connections between such displacers and the motor whereby the displacers are moved to raise the liquid level in one liquid chamber and lower it in the other liquid chamber upon movement of the motor, and a connection allowing the liquid level to equalize itself in the two chambers, substantially as described.

5. The combination with a furnace, of means for regulating the furnace draft in accordance with the pressure of the gases in the furnace comprising a motor and means for controlling the motor including two liquid chambers, a gasometer float in one chamber, a pipe connection between the gasometer float and the interior of the furnace whereby the gasometer float is subjected to the pressure of the gases in the furnace, liquid displacing plungers in the chambers, and means operated by the motor for raising one plunger and lowering the other plunger when the motor moves to thereby change the liquid level, and a pass between the two chambers to allow the liquid level thereto to resume its equilibrium, substantially as described.

6. The combination with a furnace, of means for regulating the furnace draft in accordance with the pressure of the gases in the furnace comprising a motor and means for controlling the motor including two liquid chambers, a gasometer float in one chamber having a connection with the interior of the furnace, liquid displacing plungers of unequal size in the chambers, means for operating the plungers to raise one and depress the other upon movement of the motor, and a liquid conducting pass between the two chambers, substantially as described.

7. The combination with a furnace, of means for regulating the furnace draft in accordance with the pressure of the gases in the furnace comprising a motor and means for controlling the motor including two liquid chambers, a gasometer float in one chamber having a connection with the furnace, and liquid displacers in the chambers connected with the motor to momentarily change the liquid level therein and prevent over-travel of the motor, substantially as described.

8. The combination with a furnace, of means for regulating the furnace draft in accordance with the pressure of the gases in the furnace comprising a motor and means for controlling the motor including two liquid chambers, a gasometer float in one chamber having a connection with the furnace, liquid displacers in the chambers connected with the motor to momentarily change the liquid level therein and prevent over-travel of the motor, and manually regulable means for supplying or withdrawing liquid from the chambers, substantially as described.

9. The combination with a furnace, of means for regulating the furnace draft in accordance with the pressure of the gases in the furnace comprising a motor and means for controlling the motor, including liquid chambers, a gasometer float in one chamber having a connection with the furnace, and liquid displacers of unequal size in the chambers connected with the motor to temporarily change the liquid level therein and to progressively vary the level of the liquid in the float chamber in accordance with the variations in the rate of combustion, substantially as described.

10. The combination with a furnace, of means for regulating the furnace draft in accordance with the pressure of the gases in the furnace comprising a motor and means for controlling the motor, including liquid chambers, a gasometer float in one chamber having a connection with the furnace, liquid displacers of unequal size in the chambers connected with the motor to temporarily change the liquid level therein and to progressively vary the level of the liquid in the float chamber in accordance with the variations in the rate of combustion, and manually regulable means for supplying or withdrawing liquid from the chambers, substantially as described.

In testimony whereof I have hereunto set my hand.

MERRILL G. BENJAMIN.